(12) United States Patent
Schrödinger et al.

(10) Patent No.: US 7,007,145 B2
(45) Date of Patent: Feb. 28, 2006

(54) CONTROL APPARATUS AND METHOD FOR CONTROLLING ACCESS TO A MEMORY IN AN INTEGRATED CIRCUIT FOR AN ELECTRONIC MODULE

(75) Inventors: Karl Schrödinger, Berlin (DE); Jürgen Blank, Düsseldorf (DE)

(73) Assignee: Finisar Corporation, Sunnyvale, CA (US)

( * ) Notice: Subject to any disclaimer, the term of this patent is extended or adjusted under 35 U.S.C. 154(b) by 359 days.

(21) Appl. No.: 10/638,600

(22) Filed: Aug. 11, 2003

(65) Prior Publication Data

US 2005/0038969 A1 Feb. 17, 2005

(51) Int. Cl.
*G06F 12/14* (2006.01)
(52) U.S. Cl. .......................... 711/164; 711/4; 711/103; 711/111; 711/145; 711/156
(58) Field of Classification Search ............ 711/164.4, 711/103, 111, 145, 156
See application file for complete search history.

(56) References Cited

U.S. PATENT DOCUMENTS

| | | | | |
|---|---|---|---|---|
| 5,774,544 A | * | 6/1998 | Lee et al. .................... | 713/189 |
| 5,790,663 A | * | 8/1998 | Lee et al. .................... | 705/56 |
| 6,535,988 B1 | * | 3/2003 | Poisner ...................... | 713/500 |
| 6,868,496 B1 | * | 3/2005 | Sales et al. ................. | 713/193 |
| 2002/0133714 A1 | * | 9/2002 | Sales et al. ................. | 713/200 |

OTHER PUBLICATIONS

Lew Aronson et al. (ed.): "Digital Diagnostic Monitoring Interface for Optical Transceivers", *SFF document No.: SFF-8472, Revision 9.3*, dated Aug. 1, 2002, pp. 1-29.
SFF Committee: "SFF-8053 Specification for GBIC (Gigabit Interface Converter)", *Revision 5.5*, Sep. 27, 2000, pp. 1-66.
"Cooperation Agreement for Small Form-Factor Pluggable Transceivers", dated Sep. 14, 2000, pp. 1-38.

* cited by examiner

*Primary Examiner*—Stephen C. Elmore
(74) *Attorney, Agent, or Firm*—Laurence A. Greenberg; Werner H. Stemer; Ralph E. Locher

(57) ABSTRACT

A control apparatus and a method for controlling access to a memory in an integrated circuit for an electronic module is provided. The invention includes a memory which is split into a plurality of memory areas which contain data relating to the module. The invention also includes a password register which contains at least one password for the manufacturer of the module and at least one password for a user. An access control means stipulates certain conditions for at least one of the memory areas, such as the extent to which the memory area is readable or writeable, where at least one of the following conditions can be stipulated for portions of a memory area: a memory area is readable when the manufacturer password is input; a memory area is readable when the user password is input; a memory area is readable without a password; a memory area is writeable when the manufacturer password is input; a memory area is writeable when the user password is input; a memory area is writeable without a password. And combinations of the above conditions can be stipulated according to the setting of lock bits.

19 Claims, 3 Drawing Sheets

FIG. 3

Table 1

| Memory Control Bits | | | | Password Check | | Memory Characteristics |
|---|---|---|---|---|---|---|
| UR | UW | VR | VW | UPW | VPW | |
| x | x | 1 | 1 | x | No | No Read-/Write Access |
| 1 | 1 | 0 | 0 | No | No | No Read-/Write Access |
| 0 | x | 0 | x | No | No | General Read Access |
| x | 0 | x | 0 | No | No | General Write Access |
| 1 | 1 | 0 | 1 | Yes | No | Read Access with User Password |
| X | 1 | 0 | 0 | Yes | No | Read-/Write Access with User Password |
| x | x | x | 1 | x | Yes | Read-/Write Access with Vendor Password | x= don't care; UPW= user password; VPW= vendor password

CONTROL APPARATUS AND METHOD FOR CONTROLLING ACCESS TO A MEMORY IN AN INTEGRATED CIRCUIT FOR AN ELECTRONIC MODULE

The invention relates to a control apparatus and a method for controlling access to a memory in an integrated circuit for an electronic module. In particular, the invention relates to the refinement of the access control to various memory areas in such a memory.

BACKGROUND OF THE INVENTION

Field of the Invention

The document "Small Form Factor Pluggable (SFP) Transceiver MultiSource Agreement (MSA)" dated Sep. 14, 2000 describes pluggable optoelectronic transceivers of small design. The documents "Gigabit Interface Converter (GBIC)", SFF document number: SFF-0053, rev. 5.5, Sep. 27, 2000 and "Digital Diagnostic Monitoring Interface for Optical Transceivers", SFF document number: SFF-8472, rev. 9.3, Aug. 1, 2002 describe a serial interface for such an optoelectronic transceiver and, in this connection, the design of a memory in an optoelectronic transceiver from which and to which data relating to the transceiver can be read and written. All three documents are incorporated in the present application by reference.

From the documents cited, particularly from the document SFF-8472, rev. 9.3 dated Aug. 1, 2002, it is known practice to provide a firm classification for a memory into "user read only", "user write" and "vendor access only" (exclusive access by the manufacturer).

A drawback of the firm classification of the memory in an intelligent optoelectronic transceiver which is known from these documents is that the user is not provided with sufficient opportunity to use particular memory areas and to lock them from access by third parties as well (e.g. from customers of the user). These memory areas can relate, by way of example, to the setting and programming of the module, which are enabled by the manufacturer to a limited extent, or to the storage of particular data from the user's manufacturing process.

At the same time, with digitally controlled laser drivers, it is necessary to protect the laser safety related data provided by the manufacturer against access by users. Otherwise, there would be a risk that manipulation of these data would result in the loss of the status of the laser safety. Both the manufacturer (vendor) and the user therefore need to have the opportunity to access the memory.

In this case, it is desirable for the manufacturer of the optical transceiver module to be able to program the chip by accessing the chip using the same interface as a user so that pins are saved and the design of the chip and the programming and testing of the module are simplified.

Comparable objectives can exist generally for electronic modules with an integrated circuit and an associated memory.

It will be pointed out that the term "manufacturer (vendor)" means the manufacturer of an electronic or optoelectronic module. The "user" denotes a system manufacturer who installs the electronic or optoelectronic module in an optical system.

SUMMARY OF THE INVENTION

The present invention is based on the object of providing effective access control for the memory area and hence the operation of an electronic module, particularly of an optoelectronic module.

The invention provides a control apparatus for controlling access to a memory in an integrated circuit for an electronic module, which has:
a memory which is split into a plurality of memory areas which contain data relating to the module;
a password register which can contain at least one password for the manufacturer of the module and at least one password for a user; and
access control means which stipulate for at least one of the memory areas the extent to which the memory area is readable or writeable, with at least one of the following items being respectively stipulatable for a memory area;
the memory area is readable when the manufacturer password is input,
the memory area is readable when the user password is input,
the memory area is readable without a password,
the memory area is writeable when the manufacturer password is input,
the memory area is writeable when the user password is input,
the memory area is writeable without a password.

The invention provides variable multistage access control for the memory and hence for controlling an electronic module. In this case, provision is made for the memory in question to be split into a plurality of memory areas or memory segments. A particular number of bits control access to the individual memory areas. To this end, preferably 4 times n bits are provided, if n is the number of memory areas. For each memory area, one bit is provided for reading by a user (User Read), one bit is provided for writing by a user (User Write), one bit is provided for reading by the manufacturer (Vendor Read), and one bit is provided for writing by the manufacturer (Vendor Write). In addition, at least one user password and one manufacturer password are available in each case. These bits and passwords are used to control access to the individual memory areas in the memory.

In this context, one preferred embodiment provides for the access control means to have the following elements:
a control register which contains, for at least one of the memory areas, lock bits which code whether the memory area is readable and/or writeable for the manufacturer and/or is readable and/or writeable for a user,
at least one control apparatus which is connected to the control register and to the password register and is associated with a memory area which is under consideration, where the control apparatus takes account of the lock bits and of any password which is input in order to stipulate whether or not the respective memory area under consideration is readable and/or writeable, and where,
a manufacturer password which is input cancels the effect of an lock bit for the manufacturer and of an lock bit for a user, and a user password which is input cancels the effect of an lock bit for a user.

Provision is thus made for the user password and the manufacturer password to be able to cancel the effect of the lock bits. In this context, the user password influences just the User Read/User Write bits. The manufacturer password, on the other hand, preferably influences the Vendor Read bits, the Vendor Write bits, and the User Read bits and the User Write bits.

In addition, provision is preferably made for the control register to contain four lock bits for each of the memory areas, with a first lock bit stipulating whether the memory area is readable for the manufacturer, a second lock bit stipulating whether the memory area is readable for a user, a third lock bit stipulating whether the memory area is writeable for the manufacturer, and a fourth lock bit stipulating whether the memory area is writeable for the user.

One preference is that, in this context, the first lock bit dominates the second lock bit, and the third lock bit dominates the fourth lock bit, such that a memory area stipulated as unreadable or unwriteable by the first and third memory bits is unreadable or unwriteable even if the second and fourth lock bits indicate that the memory area is readable or writeable. In this case, the following priority thus applies: the vendor bit dominates the user bit. In addition, the vendor password dominates the user password, as already mentioned. The result of this is that, if the manufacturer locks particular areas, this locking cannot be canceled again by a user, even if he uses the user password. The user can thus influence only areas which have been enabled by the manufacturer.

In another preferred refinement, the control apparatus takes account of the lock bits and of any password which is input in order to stipulate access to the individual memory areas as follows:

a memory area under consideration is readable when the manufacturer password is input if the first lock bit (Vendor Read Bit) is set to "Lock" and the manufacturer's password has been input correctly;

a memory area under consideration is readable for a user if the second lock bit (User Read Bit in the control register is set to "Lock" and the user's password has been input correctly, and at the same time the first lock bit is not set to "Lock", a memory area under consideration is readable without a password if both the first lock bit and the second lock bit are not set to "Lock", a memory area under consideration is writeable for the manufacturer if the third lock bit (Vendor Write Bit) is set to "Lock" and the manufacturer's password has been input correctly;

a memory area under consideration is writeable for a user if the fourth lock bit (User Write Bit) in the control register is set to "Lock" and the user's password has been input correctly, and at the same time the third lock bit is not set to "Lock", a memory area under consideration is writeable without a password if both the third lock bit and the fourth lock bit are not set to "Lock".

In the remaining cases, it is not possible to read or write to the respective memory areas.

It will be pointed out that write authorization preferably also includes read authorization. Write authorization thus preferably dominates read authorization, i.e. the third lock bit dominates the first lock bit, and the fourth lock bit dominates the second lock bit, in so far as write authorization also results in read authorization. In the case of this refinement, a memory area under consideration is both readable and writeable in the last three cases cited above.

Preferably, the lock bits in the control register are locked by a write protection so that third parties cannot change the lock combination. In this case, however, provision is preferably made for the lock bits in the control register to be able to be overwritten when a password is input. The lock bits which relate to a memory area's readability and writeability for the manufacturer or a user can be overwritten when the manufacturer password is input, and the lock bits which relate to a memory area's readability and writeability for a user can be overwritten when a user password is input. In one preferred refinement, the password register contains at least one further manufacturer password, with input of a corresponding manufacturer password enabling a further, otherwise unaddressable memory area.

In another refinement of the invention, a memory area locked by the manufacturer can be locked completely by setting a particular bit or a particular bit combination, which means that reading or writing is no longer possible even with a manufacturer password. As a result, particular laser safety related data can be effectively protected.

The inventive method is used for stipulating access to a memory in an optoelectronic module and has the following steps:

a memory in the optoelectronic module is split into a plurality of memory areas;

the manufacturer writes to at least one of the memory areas;

the manufacturer sets lock bits which indicate which of the memory areas are locked for exclusive use by the manufacturer and are readable and/or writeable only with a manufacturer password;

a user writes to at least one of the memory areas not locked by the manufacturer; and the user sets lock bits which indicate which of the memory areas are readable and/or writeable only with a manufacturer password.

BRIEF DESCRIPTION OF THE FIGURES

The invention is explained in more detail below using an exemplary embodiment with reference to the figures, in which:

FIG. 3 shows a table illustrating the logic relationship between control bits and passwords for access control using a plurality of examples.

DESCRIPTION OF A PREFERRED EXEMPLARY EMBODIMENT

Figure 1:
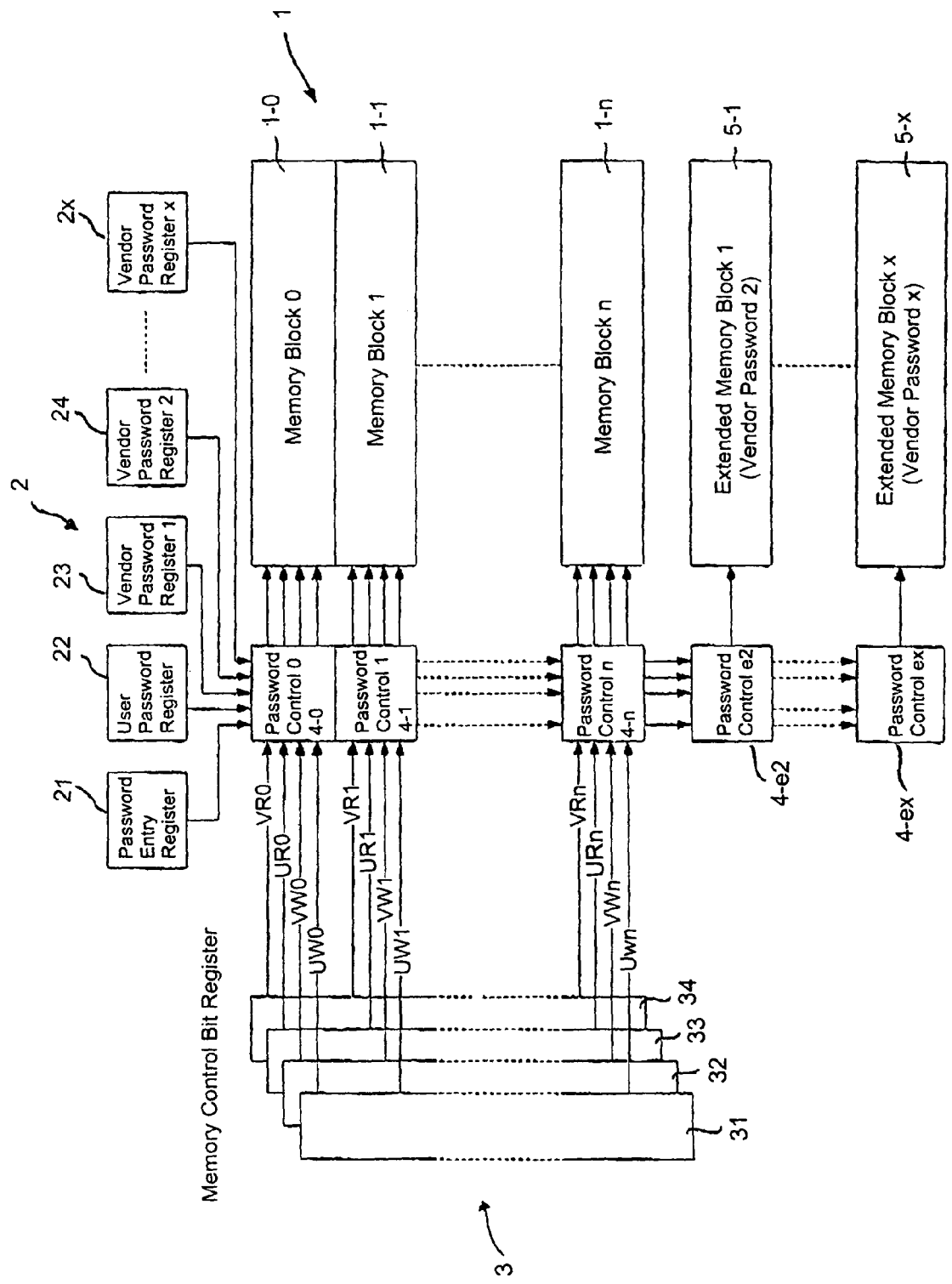
FIG. 1 shows the design of an access control device for controlling access to the memory in an optoelectronic module.

FIG. 1 shows the design of an access control device for controlling access to a memory 1 in an electronic module, which is preferably an optoelectronic transceiver having a transmission device and a reception device or is just an optoelectronic transmission device. In this case, the transmission device has, in a manner which is known per se, a laser diode, a driver chip for driving the laser diode and a control IC which communicates with the outside world via an interface. The control IC has a memory which contains particular information relating to the operation of the transmission apparatus or of the electronic module, particularly laser safety related information which the laser driver takes as a basis for producing actuation signals for the laser diode, and also, by way of example, data relating to the setting or programming of the module or data from the user's manufacturing process. The functions of the control IC can also be provided in a microcontroller by software/firmware. The user is the system manufacturer who integrates the transceiver into an optical system.

Such a memory is represented by the memory 1 in FIG. 1. In this case, the memory 1 is split into a plurality of n memory areas 1-0, . . . , 1-n. The individual memory areas are referred to as "memory blocks" in FIG. 1. Examples of the content of the individual memory areas are cited in the SFF document No: SFF-8472, rev. 9.3 dated Aug. 1, 2002, the content of which is incorporated into the present application by reference.

It is pointed out that the individual memory areas 1-0, . . . , 1-n can be of different sizes. The individual memory areas are readable and writeable for an interface (not shown). This is preferably a serial interface based on the standard I2C.

To control access to the individual memory areas 1-0, . . . , 1-n, a password register 2, a control register 3 and a plurality of control apparatuses 4-0, . . . , 4-n are provided. The password register 2 has a password input register 21, a user password register 22, a first manufacturer password register 23 and, optionally, additional manufacturer password registers 24 to 2x. The user password register 22 permanently stores a user password, and the manufacturer password registers 23 to 2x each store a manufacturer password. A user can use the input register 21 to input a password at the present time. The outputs of all the registers 21 to 2x are connected to the input of the individual control apparatuses 4-0, . . . , 4-n. The registers 21 to 2x are preferably contained in a programmable read only memory (EEPROM).

The control register 3, which is also referred to as the "memory control bit register", has 4×n bits, with four bits being provided for each memory area 1-0, . . . , 1-n. The individual bits, subsequently referred to as lock bits or as control bits, stipulate whether a memory area 1-0, . . . , 1-n is readable or writeable with or without a manufacturer password and with or without a user password. To this end, each memory area 1-0, . . . , 1-n in the control register 3 has an associated bit VRx (Vendor Read Control Bit) which stipulates whether the associated memory area is readable for the manufacturer. In addition, each memory area has an associated bit URx (User Read Control Bit) which stipulates whether the memory area under consideration is readable for a user. In addition, each memory area has an associated bit VWx (Vendor Write Control Bit) which stipulates whether the memory area is writeable for the manufacturer. Finally, each memory area in the control register 3 has an associated bit UWx (User Write Control Bit) which stipulates whether the memory area is writeable for a user. In this case, "x" is a respective wildcard for the memory area under consideration and represents a number between "0" and "n".

The control register 3 is in the form of an EEPROM or RAM chip, for example. The individual bits VRx, URx, VWx, UWx can be arranged in columns 31, 32, 33, 34. However, the control register 3 can contain the control or lock bits in another arrangement as well.

The lock bits VRx, URx, VWx, UWx associated with a memory area 1-0, . . . , 1-n are supplied to the control apparatus 4-0, . . . , 4-n associated with the respective memory area, which means that the lock bits for the associated memory area and the outputs of the individual registers 21–2x are applied to each control apparatus. The control apparatuses, denoted as "password control" in FIG. 1, control access to the respectively associated memory area 1-0, . . . , 1-n as follows: the lock bits VRx, URX, VWx, UWx stipulate for each memory area whether the memory area is readable or writeable for the manufacturer and/or is readable or writeable for a user. If the bit VRx is set to "0", the memory area is readable. If the bit VRx is set to "1", the memory area is locked. However, it is now important for the effect of the VRx lock bit to be canceled if the correct manufacturer password has been input in the input register 21. For this case, the memory area is then readable.

In the same way, access control is stipulated by the bit VWx. If the bit is set to "0", the associated memory area is writeable. If the bit is set to "1", the memory area is locked for writing. This locking effect can be canceled, however, if a user inputs the correct manufacturer password, which is stored in the register 23, into the input register 21. In this case, the control apparatus 4-0, . . . , 4-n makes a comparison to determine whether the password which has been input is the same as the stored password in the register 23.

If the bit URx is set to "0", the associated memory area is enabled for reading. If the bit URx is set to "1", the memory area is locked. This locking can be canceled, however, if the correct user password from the register 22 is input in the input register. In a corresponding manner, the bit UWx stipulates whether the associated memory area is writeable. In this case, the effect of an lock bit can again be canceled if the correct user password has been input in the input register 21.

The effect of the lock bits URx, UWx can also be canceled if the correct manufacturer password from the register 23 has been input in the input register 21. The manufacturer password thus influences both the bits VRx, VWx (Vendor Read, Vendor Write) and the bits URx, UWx (User Read, User Write). By contrast, the user password influences only the bits URx, UWx (User Read, User Write). A memory area locked by the manufacturer thus cannot be enabled even with a correct user password.

For the rest, the following priority for the bits VRx, URx, VWx, UWx applies: the vendor bits VRx, VWx dominate the user bits URx, UWx. In addition, the manufacturer password (Vendor Password) dominates the user password. This ensures that areas which are locked by the manufacturer and for which the bit VRx and/or the bit VWx is set to "Lock" cannot be enabled by the user, even if he inputs a correct user password. The user can thus influence only such memory areas as have been enabled by the manufacturer. In this regard, two-stage access control exists.

The access control resulting from the control in FIG. 1 is shown in FIG. 3 with reference to a few examples. Since a particular memory area is under consideration, the individual lock bits are identified merely by VR, UR, VW and UW. "UPW" denotes the user password, and "VPW" denotes the manufacturer password. If a control bit (or lock bit) in the control register is set to "1", the corresponding memory area is locked, and if it is set to "0", the corresponding memory area is enabled. The character "x" in the table in FIG. 1 signifies that the value of the respective control bit can be either "0" or "1" without making a difference.

In line with the exemplary embodiment in the first row, the bits VR and VW are set to "1". The associated memory area is thus locked both for reading and for writing. Since there is no match with the manufacturer password, locking is also not canceled. There is thus no read or write access.

In the exemplary embodiment in the second row, although the bits VR and VW are set to "0", which means that the memory area has not been locked by the manufacturer, setting the bits UR and UW to "1" has resulted in the user setting a lock. This could be canceled only if the user password UPW and/or the manufacturer password VPW were to be input correctly. Since this is not the case, there is no read or write access in this case either.

In the exemplary embodiment in the third row, the bits UR and VR are set to "0". This means that there is general read access.

In the exemplary embodiment in the fourth row, the bits UW and VW are set to "0", i.e. there is general write access.

In the exemplary embodiment in the fifth row, the bits UR, UW and VW are set to "1" and the bit "VR" is set to "0". The set bits UW and VW mean that there is write protection in all cases. Setting the bit UR means that the memory area is initially locked for reading. However, this locking can be canceled if there is a match with the user password. There is thus read access with a user password. If the bit "VR" were also to be set, read access would be possible only with a manufacturer password.

In the exemplary embodiment in the sixth row, the bits VR and VW are not set, i.e. the manufacturer has provided no read or write protection. By contrast, the bit UW is set to "1". However, the associated memory area's resultant locking for writing is canceled because the correct user password has been provided. Hence, there is read and write access with a user password. In this connection, it should be noted that write authorization also includes read authorization in this exemplary embodiment. Hence, the value of the bit UR makes no difference.

In the exemplary embodiment in the seventh row, the bit VW is set to "1", i.e. the manufacturer has prescribed write protection. This write protection is canceled on the basis of the password match with the manufacturer password, however. Hence, there is read and write access with a manufacturer password. Again it should be noted that write authorization also includes read authorization. This means that the value of the bit VR makes no difference.

Coming back to FIG. 1, it is noted that the further manufacturer passwords from the registers 24, ... 2x can enable further addressable memory areas 5-1 to 5-x. Enabling is controlled by means of further control apparatuses 4-en, ..., 4-2x which are connected to the output of the respective manufacturer password register 24, ..., 2x.

The memory areas 5-1, ..., 5-x are extended memory areas (Memory Blocks) which would not be addressable without the additional manufacturer passwords 2 to x. This is useful in order to be able to address larger data records than are provided as standard. This means that it is possible to realize more complex control, for example further data records or larger or further look-up tables. In particular, the address range provided in the multi source agreement from the document SFF-8472, rev. 9.3 dated Aug. 1, 2002 would not permit such relatively large data records.

In addition, the following is pointed out:

The bits contained in the control register 3 are fundamentally locked by a write protection. This ensures that a third party cannot change the user's or manufacturer's originally set locking combination. The write protection is provided by virtue of the memory area in the control register 3 which contains these bits having a writing lock.

However, provision can be made for the control bits VRx, URx, VWx, UWx to be able to be changed if an appropriate password has been provided. If the manufacturer password has been provided, all of the control bits VRx, URx, VWx, UWx can be changed, and if the user password has been provided then only the control bits URx, UWx can be changed.

In addition, provision can be made for a memory area to be blocked irrevocably, at least for individual memory areas 1-0, ..., 1-n, by setting a particular bit or a particular bit combination. If such a bit or such a bit combination exists, all memory areas originally locked by the manufacturer for write access operations are irrevocably locked. This is necessary in order to prevent unauthorized access operations or changes to laser safety related data in laser drivers and hence to ensure the laser safety. Hence, a password lock may not provide 100% protection.

Provision can likewise be made for a user to lock a memory area absolutely. Such a memory area is then no longer writeable even with a user password. However, it is still writeable when the correct manufacturer password has been provided.

A bit or bit combination used by the manufacturer to provide absolute write protection for a memory area is subsequently also referred to as a "manufacturer lock bit" ("Vendor Lock Bit"). A bit or bit combination used by a user to lock a memory area is subsequently also referred to as a "user lock bit".

The vendor lock bit and the user lock bit are written to the control register 3, for example, if appropriate. This provides the desired writing lock for the memory areas which contain the respective bits VRx, URx, VWx and UWx.

For a specific implementation of the access control described, provision can be made for all the data to be held in an external EEPROM memory which is connected to the transceiver module's control apparatus via an internal I2C interface. The external EEPROM holds all the information which is required to operate the module. In the operation mode or change mode, the data are copied from the EEPROM to an internal RAM, to which a user has access via an externally routed I2C interface. In this case, write operations to the RAM are passed through to the EEPROM.

Figure 2:
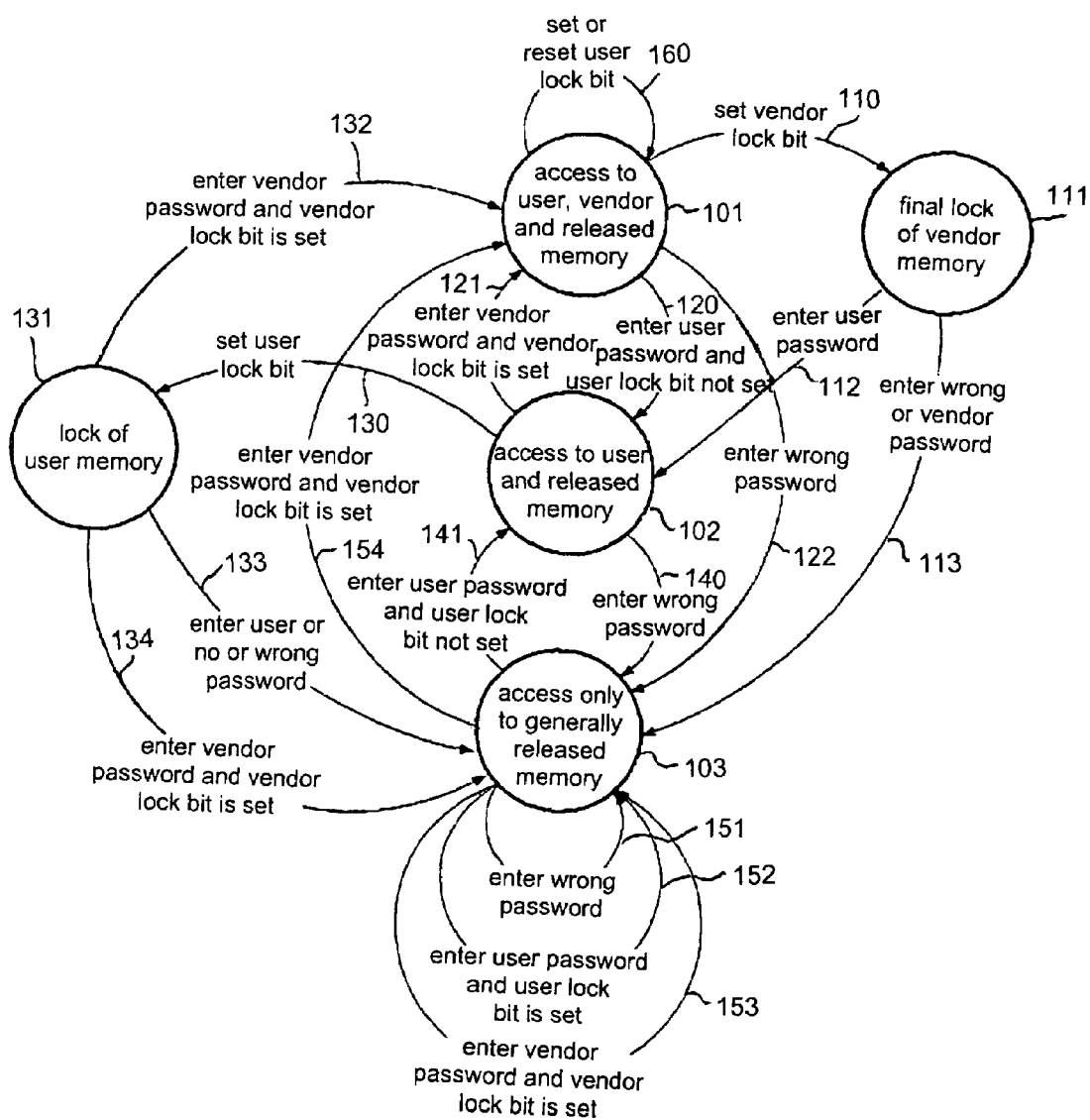
FIG. 2 shows an illustration of the flow control for password access to areas of the memory in FIG. 1.

FIG. 2 again explains the access control for the memory area in an optoelectronic module's memory, as already explained with reference to FIG. 1.

There are enabled memory areas ("Released Memory"), memory areas enabled only for the user when a user password has been provided ("User Memory"), and memory areas enabled for the manufacturer when a manufacturer password has been provided ("Vendor Memory").

According to what has been explained above, a memory area is enabled for reading or writing when the bits "UR" and "VR" or "UW" and "VW" are set to "0". In the "Vendor Memory" area, the bits UR and UW are set to "1", which means that reading and writing are possible only when a user password has been provided. The "Vendor Memory" area is distinguished in that the bits VR and VW are set, which means that reading and writing are possible only when the manufacturer password has been provided.

Access to all three types of memory areas (Vendor Memory, User Memory, Released Memory) is possible in the area 101. Access just to the "User Memory" and "Released Memory" areas is possible in the area 102. The area 103 identifies the area in which access is possible only to enabled memory areas "Released Memory".

From the area 101, setting 110 a manufacturer lock bit allows the "Vendor Memory" area to be locked completely and finally, cf. area 111. Input 112 of the user password then permits access to the area 102. If an incorrect password is input 113, access is possible only to generally enabled memory areas 103. On account of the "Vendor Memory" area being locked absolutely, input of the correct manufacturer password also makes no difference thereto.

If, from the area 101, the user password is input 120 correctly and the user lock bit is not set, the user has access to the memory area 102. From the memory area 102, there is extended access to the memory area 101 if the manufacturer password has been input and the manufacturer lock bit is not set. If, from the area 101, an incorrect password is input 122, there is now only access to the generally enabled memory area 103. From the area 102, a user can set a user lock bit 130 in order to lock the "User Memory" area, cf. area 131. On the basis of such locking, the area 101 can be accessed only when the correct manufacturer password has been provided 132. In this case, the manufacturer lock bit naturally cannot be set.

If an incorrect password is input 133 from the area 131, there is again access to the generally enabled area 103. This is the case even when the correct user password is input, since the locking by the user lock bit cannot be canceled again (apart from if the manufacturer password is input). If the correct manufacturer password is input but at the same time the manufacturer lock bit is set 134, there is access from the area 131 only to the area 103.

In addition, there is access from the area 102 to the area 103 when an incorrect password 140 is input. Conversely, there is access from the area 103 to the area 102 if the correct user password is input and the user lock bit is not set 141.

Inputting an incorrect password 151, inputting 152 the correct user password when the user lock bit is set, and inputting 152 the correct manufacturer password when the manufacturer lock bit is set each do not provide access from the area 103. Similarly, from the area 101, there is no harm in the user lock bit being set or reset 160, because this bit is dominated by the manufacturer password.

To stipulate access to the memory 1 in the optoelectronic module, the following method is preferably used. First, the memory 1 in the optoelectronic module is split into a plurality of memory areas 1-0 to 1-2 if this has not yet been done. Next, the manufacturer writes laser safety related data, for example, to at least one of the memory areas. When this has been done, the manufacturer sets lock bits which indicate which of the memory areas are locked for exclusive use by the manufacturer and are readable and/or writeable only with the manufacturer password. To this end, the bits VRx, VWx are set in a suitable manner, cf. FIG. 1.

The module which has been write protected in this manner is delivered to a user, i.e. to a system manufacturer, by the module's manufacturer. The user is now likewise able to write data to at least one of the memory areas which have not been locked by the manufacturer. When this has been done, the user sets lock bits which indicate which of the memory areas are readable and/or writeable only with a manufacturer password. To this end, the bits URx, UWx are set in a suitable manner.

A customer of the user now has access only to the generally enabled areas. If it is necessary to read or write to areas which are locked by the user password and/or by the manufacturer password, then it is necessary to input the correct password in order to do so. In addition, provision can be made for particular areas to be locked completely by the manufacturer or user, in which case a "manufacturer lock bit" and a "user lock bit" are set, as explained above.

Implementation of the invention is not limited to the exemplary embodiments illustrated above, which are to be understood merely by way of example. A person skilled in the art will recognize that numerous alternative variant embodiments exist which, despite being different than the exemplary embodiment described, make use of the disclosure defined in the claims which follow.

We claim:

1. A control apparatus for controlling access to a memory in an integrated circuit for an electronic module, having:
   a memory organized into a plurality of memory areas each containing data relating to the module;
   a password register connected to said memory and configured to contain at least one password for a manufacturer of the module and at least one password for a user; and
   an access controller connected to at least one of said memory and said password register, said access controller stipulating for at least one of said memory areas an extent to which said at least one memory area is at least one of readable and writeable, said at least one memory area having at least one stipulatable characteristic selected from the group consisting of;
   said at least one memory area being readable when said password for the manufacturer is input;
   said at least one memory area being readable when said password for the user is input;
   said at least one memory area being readable without a password;
   said at least one memory area being writeable when said password for the manufacturer is input;
   said at least one memory area being writeable when said password for the user is input; and
   said at least one memory area being writeable without a password.

2. The control apparatus according to claim 1, where said access controller has:
   a control register containing, for at least one of said memory areas, lock bits coding whether said at least one memory area is at least one of:
   readable for the manufacturer;
   writeable for the manufacturer;
   readable for the user; and
   writeable for the user; and
   at least one control apparatus connected to said control register and to said password register and associated with a memory area under consideration, said at least one control apparatus taking account of said lock bits and of any password input to stipulate if said respective memory area under consideration is at least one of readable and writeable, and a manufacturer password input canceling an effect of a lock bit for the manufacturer and of a lock bit for a user, and a user password input canceling an effect of a lock bit for a user.

3. The control apparatus according to claim 2, wherein said control register contains four lock bits for each of said memory areas, a first of said lock bits (VR0–VRn) stipulating if a respective one of said memory areas is readable for the manufacturer, a second of said lock bits (UR0–URn) stipulating if said one memory area is readable for a user, a third lock bit (VW0–VWn) stipulating if said one memory area is writeable for the manufacturer, and a fourth lock bit (UW0–UWn) stipulating if said one memory area is writeable for the user.

4. The control apparatus according to claim 3, wherein said first lock bit (VR0–VRn) dominates said second lock bit (UR0–URn) and said third lock bit (VW0–VWn) dominates said fourth lock bit (UW0–UWn) to make a memory area stipulated as unreadable or unwriteable by said first and third memory bits be unreadable or unwriteable even if said second and fourth lock bits indicate that said memory area is readable or writeable.

5. The control apparatus according to claim 4, wherein said access controller, said password register, and said memory take account of said lock bits and of any password input to stipulate that:
   a memory area under consideration is readable when the manufacturer password is input if the first lock bit (VR0–VRn) is set to "Lock" and the manufacturer's password has been input correctly;
   a memory area under consideration is readable for a user if said second lock bit (UR0–URn) in said control register is set to "Lock" and said password of the user has been input correctly and, at the same time, said first lock bit (VR0–VRn) is not set to "Lock";

a memory area under consideration is readable without a password if both said first lock bit (VR0–VRn) and said second lock bit (UR0–URn) are not set to "Lock";

a memory area under consideration is writeable for the manufacturer if said third lock bit (VW0–VWn) is set to "Lock" and said password of the manufacturer has been input correctly;

a memory area under consideration is writeable for a user if said fourth lock bit (UW0–UWn) in said control register is set to "Lock" and said password of the user has been input correctly and, at the same time, said third lock bit (VW0–VWn) is not set to "Lock"; and a memory area under consideration is writeable without a password if both said third lock bit (VW0–VWn) and said fourth lock bit (UW0–UWn) are not set to "Lock".

6. The control apparatus according to claim 3, wherein said access controller, said password register, and said memory take account of said lock bits and of any password input to stipulate that:

a memory area under consideration is readable when the manufacturer password is input if the first lock bit (VR0–VRn) is set to "Lock" and the manufacturer's password has been input correctly;

a memory area under consideration is readable for a user if:

said second lock bit (UR0–URn) in said control register is set to "Lock" and said password of the user has been input correctly and, at the same time, said first lock bit (VR0–VRn) is not set to "Lock";

a memory area under consideration is readable without a password if both said first lock bit (VR0–VRn) and said second lock bit (UR0–URn) are not set to "Lock";

a memory area under consideration is writeable for the manufacturer if said third lock bit (VW0–VWn) is set to "Lock" and said password of the manufacturer has been input correctly;

a memory area under consideration is writeable for a user if said fourth lock bit (UW0–UWn) in said control register is set to "Lock" and said password of the user has been input correctly and, at the same time, said third lock bit (VW0–VWn) is not set to "Lock"; and a memory area under consideration is writeable without a password if both said third lock bit (VW0–VWn) and said fourth lock bit (UW0–UWn) are not set to "Lock".

7. The control apparatus according to claim 2, wherein said lock bits in said control register are locked by a write protection.

8. The control apparatus according to claim 2, wherein said lock bits in said control register are write protection locked.

9. The control apparatus according to claim 2, wherein said lock bits in said control register can be overwritten only when a password is input, said lock bits relating to a readability and a writeability of said at least one memory area being able to be overwritten by one of the manufacturer and the user when the manufacturer password is input, and said lock bits relating to the readability and the writeability of said at least one memory area being able to be overwritten by a user when a user password is input.

10. The control apparatus according to claim 9, wherein said lock bits relating to said memory areas that are one of readable and writeable only with said password of the manufacturer have absolute write protection when one of a given bit exists and a given bit combination exists.

11. The control apparatus according to claim 2, wherein said lock bits relating to said memory areas that are one of readable and writeable only with said password of the manufacturer have absolute write protection when one of a given bit exists and a given bit combination exists.

12. The control apparatus according to claim 1, wherein said password register contains at least one further manufacturer password enabling, upon input thereof, a further, otherwise unaddressable, memory area.

13. The control apparatus according to claim 1, wherein said stipulation that a given memory area is writeable also includes a read authorization.

14. The control apparatus according to claim 1, wherein the electronic module is an optoelectronic module.

15. A control apparatus for controlling access to a memory in an integrated circuit for an electronic module, having:

a memory divided into a plurality of memory areas each containing data relating to the module;

a password register connected to said memory and configured to contain at least one password for a manufacturer of the module and at least one password for a user; and access control means connected to said memory, said access control means stipulating for at least one of said memory areas an extent to which said at least one memory area is readable or writeable, said at least one memory area having at least one stipulatable characteristic selected from the group consisting of;

said at least one memory area being readable when said password for the manufacturer is input;

said at least one memory area being readable when said password for the user is input;

said at least one memory area being readable without a password;

said at least one memory area being writeable when said password for the manufacturer is input;

said at least one memory area being writeable when said password for the user is input; and said at least one memory area being writeable without a password.

16. A method for controlling access to a memory in an integrated circuit for an optoelectronic module, which comprises:

organizing a memory in the optoelectronic module into a plurality of memory areas;

a manufacturer:
 writing to at least one of the memory areas; and
 setting lock bits indicating which of the memory areas are locked for exclusive use by the manufacturer and are at least one of readable and writeable only with a manufacturer password;

a user writing to at least one of the memory areas not locked by the manufacturer; and the user setting lock bits indicating which of the memory areas are at least one of readable and writeable only with a manufacturer password.

17. The method according to claim 16, which further comprises:

providing four lock bits for each memory area, a first of the lock bits (VR0–VRn) stipulating if the memory area is readable for the manufacturer, a second of the lock bits (UR0–URn) stipulating if the memory area is readable for the user, a third of the lock bits (VW0–VWn) stipulating if the memory area is writeable for the manufacturer, and a fourth of the lock bits (UW0–UWn) stipulating if the memory area is writeable for the user; and carrying out the manufacturer setting step by setting at least one of the first and third lock bits.

18. The method according to claim 17, which further comprises carrying out the user setting step by setting at least one of the second and fourth lock bits.

19. The method according to claim 16, which further comprises carrying out the user setting step by setting at least one of the second and fourth lock bits.

* * * * *